United States Patent
Pohjola et al.

(10) Patent No.: US 7,593,638 B2
(45) Date of Patent: Sep. 22, 2009

(54) SECURE UPSTREAM TRANSMISSION IN PASSIVE OPTICAL NETWORKS

(76) Inventors: Olli-Pekka Pohjola, Kristianinkatu 7 C 41, FIN-00170 Helsinki (FI); Ari Tervonen, Kiertomaentie 28 A, FIN-01260 Vantaa (FI)

( * ) Notice: Subject to any disclaimer, the term of this patent is extended or adjusted under 35 U.S.C. 154(b) by 604 days.

(21) Appl. No.: 10/717,601

(22) Filed: Nov. 21, 2003

(65) Prior Publication Data
US 2005/0074239 A1    Apr. 7, 2005

(30) Foreign Application Priority Data
Oct. 2, 2003    (FI) ................................. 20031429

(51) Int. Cl.
*H04J 14/00*    (2006.01)
(52) U.S. Cl. ............... 398/72; 398/66; 398/67; 398/68; 398/69; 398/70; 398/71; 398/58; 398/59; 398/84; 398/87; 398/89; 398/98; 398/99; 398/100; 398/101; 385/24; 385/37; 370/390; 370/389; 370/468; 370/352; 370/442; 725/121; 725/127; 725/129; 725/125; 725/105
(58) Field of Classification Search ........... 398/58, 398/63, 84, 99, 72, 70, 71, 59, 66, 67, 68, 398/69, 79, 85, 87, 81, 100, 98, 89; 385/24, 385/37; 370/390, 352, 389, 468, 442, 465; 725/121, 125, 127, 129, 105, 106
See application file for complete search history.

(56) References Cited

U.S. PATENT DOCUMENTS

| | | | |
|---|---|---|---|
| 6,404,524 B1 | 6/2002 | Etemad | |
| 6,684,031 B1* | 1/2004 | Kogelnik et al. | 398/99 |
| 6,925,263 B2* | 8/2005 | Horne | 398/154 |
| 2002/0076039 A1 | 6/2002 | Levens | |
| 2004/0013360 A1* | 1/2004 | Smets | 385/31 |
| 2005/0078958 A1* | 4/2005 | Chae et al. | 398/41 |

FOREIGN PATENT DOCUMENTS

| | | |
|---|---|---|
| EP | 0 105 461 | 4/1984 |
| JP | 59-83108 A | 5/1984 |
| JP | 3-502033 A | 5/1991 |
| JP | 6-504656 A | 5/1994 |
| JP | 2000-151517 A | 5/2000 |
| WO | WO 89/05070 A1 | 6/1989 |

(Continued)

OTHER PUBLICATIONS

PCT International Search Report, International Application No. PCT/FI 2004/000486, dated Dec. 1, 2004.

(Continued)

*Primary Examiner*—Hanh Phan (57) ABSTRACT

A method and system for ensuring confidentiality of signal transmission in a point-to-multi point data transmission network like Ether net passive optical network, including at least one hub, at least one transmission medium and at least one station connected to the hub via the transmission medium. When an upstream signal is transmitted from a first station, the upstream signal is reflected by at least one disturbing reflector for producing a disturbing reflection. The disturbing reflection combines with a second reflection of the upstream signal and renders the second reflection undependable by a second station.

17 Claims, 6 Drawing Sheets

FOREIGN PATENT DOCUMENTS

| WO | WO 92/10887 A1 | 6/1992 |
|---|---|---|
| WO | WO 00/30281 A1 | 5/2000 |

OTHER PUBLICATIONS

The Office Action for Japanese application No. 2006-530309 drafted on Jan. 10, 2008.

The International Preliminary Report on Patentability for PCT/FI2004/000486 issued on Apr. 3, 2006.

The Written Opinion for PCT/FI2004/000486 issued on Jan. 12, 2004.

* cited by examiner

SECURE UPSTREAM TRANSMISSION IN PASSIVE OPTICAL NETWORKS

BACKGROUND OF THE INVENTION

1. Field of the Invention

The invention relates to communication networks and optical transmission technology. Particularly, the invention relates to Ethernet passive optical networks and improving security therein using optical disturbing reflectors.

2. Description of the Related Art

In the last few years the requirements for consumer bandwidth have grown rapidly. To meet the demand for increased bandwidth new access network technologies have been developed. One such technology is based on the Institute of Electrical and Electronics Engineers (IEEE) 802.3ah standard. 802.3ah is a trademark of the IEEE Inc. The standard is also known as Ethernet in the First Mile (EFM). The aim of IEEE 802.3ah is to bring Ethernet to ordinary consumers, thereby becoming an alternative for modem dial up lines and DSL connections as the primary access between a consumer and her internet service provider. The IEEE 802.3ah standard also introduces the Ethernet Passive Optical Networks (EPON) concept. The EPON is a Point-to-Multipoint (P2MP) network topology. The topology is implemented with passive optical splitters and Media Access Control (MAC) and MAC Control sublayers and physical layers that support this topology.

Figure 1:
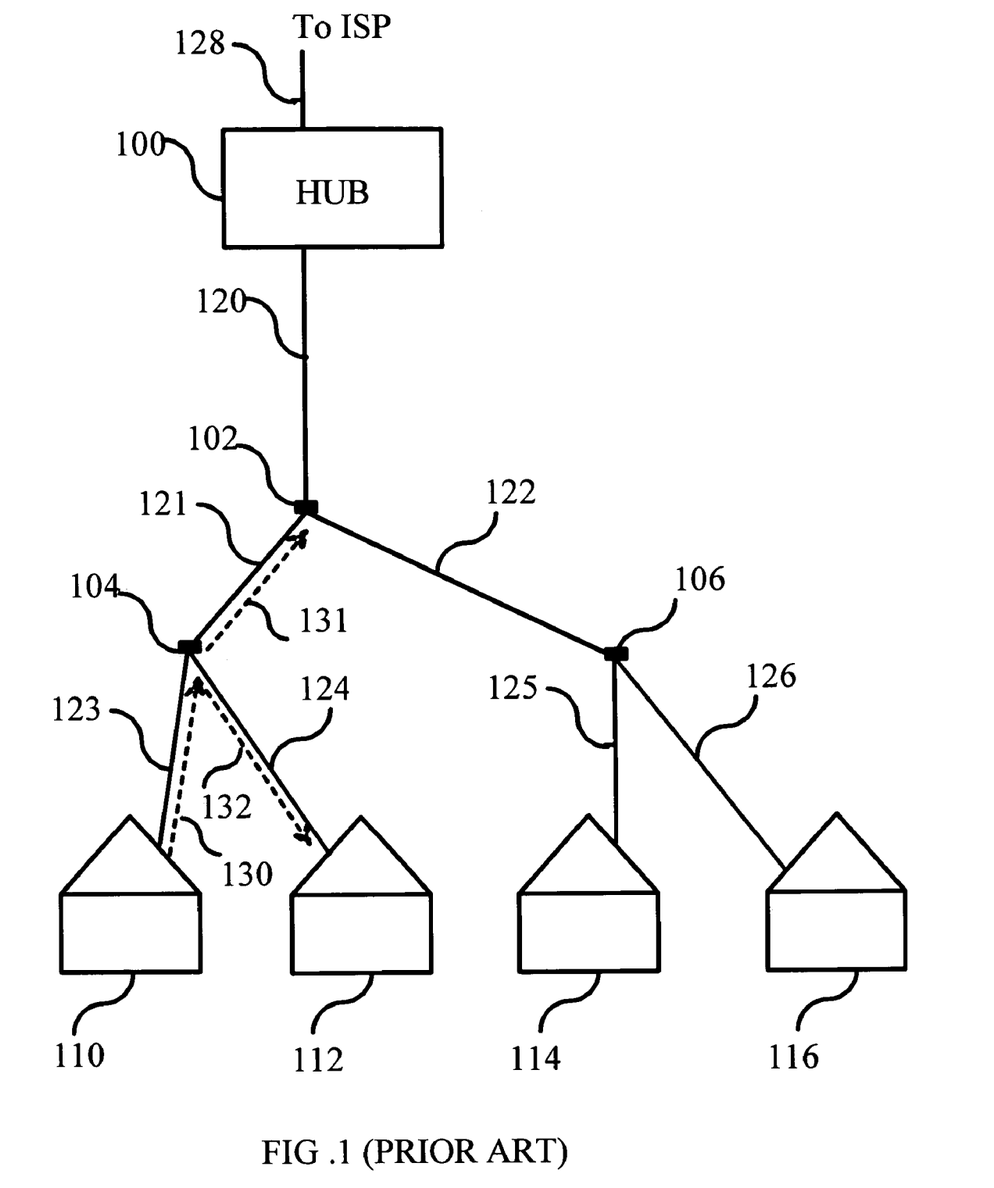
FIG. 1 is a block diagram illustrating a prior art solution that shows the structure and topology of an EPON.

Reference is now made to FIG. 1, which illustrates the architecture of a prior art EPON. The EPON comprises a HUB 100, to which an optical fiber 120 is connected. HUB 100 may be a passive physical layer signal repeater or a higher protocol layer equipment such as a bridge or a router. In some contexts a HUB is also referred to as an OLT (Optical Line Terminal). For the purpose of this invention a HUB such as HUB 100 is generally any kind of piece of network equipment that engages in communication with at least one optical network unit in the EPON or other equivalent medium. The optical fiber must be connected to Optical Network Units (ONU) 110, 112, 114 and 116. Typically, the ONUs are located in customer premises. HUB 100 connects the EPON to an Internet Service Provider (ISP) access router or similar equipment via an upstream connection 128. In order to accomplish the connecting of HUB 100 to each of the ONUs 110-116, an optical fiber 120 connects to an optical splitter 102, which connects to fibers 121 and 122. Fiber 121 connects to fibers 123 and 124 via an optical splitter 104. Finally, fiber 123 is connected to ONU 110, fiber 124 to ONU 112, a fiber 125 to ONU 114 and a fiber 126 to ONU 116. The direction from the ONUs 110-116 towards HUB 100 is referred to as upstream, whereas the opposite direction from HUB 100 towards the ONUs 110-116 is referred to as downstream. A signal 130, 131 transmitted from ONU 110 traverses towards HUB 100 via optical splitters 104 and 102. However, a part of signal 130 may be reflected, for instance, from splitter 104 making the signal perceivable at ONU 112. Upstream and downstream signal traverses in the same fiber using different wavelengths. Other option is to have separate fiber for up and downstream but this does not remove the security problem.

The drawback of the prior art IEEE 802.3ah is that the upstream traffic from any given ONU may be detectable from other ONU access points due to various unwanted signal reflections. The unwanted signal reflections may not be removed or even noticed from the network beforehand. The problem is further illustrated in FIG. 2. An ONU 202 transmits a signal 220 that is to be received exclusively by a HUB 230. Along the transmission path from ONU 202 to HUB 230, there is at least a first fiber 212, an optical splitter 200 and a second fiber 210. Fiber 210 connects to at least two fibers 212 and 214 by means of optical splitter 200. Associated with fiber 210 is also a reflecting element 206, which reflects part of signal 220 as a reflection 222, which is an unwanted reflection Reflection 222 is in turn split at optical splitter 200 and becomes perceivable at an ONU 204. Reflecting element 206 can be, for instance, a fiber connector, a fiber breaking point, an open fiber end or a second splitter along the fiber path between ONU 202 and HUB 230. Reflecting elements where discrete back reflections may occur cause privacy and confidentiality problems in EPONs. The most critical places in EPONs are on the upstream side of the splitter that is closest to the transmitting user.

Figure 2:
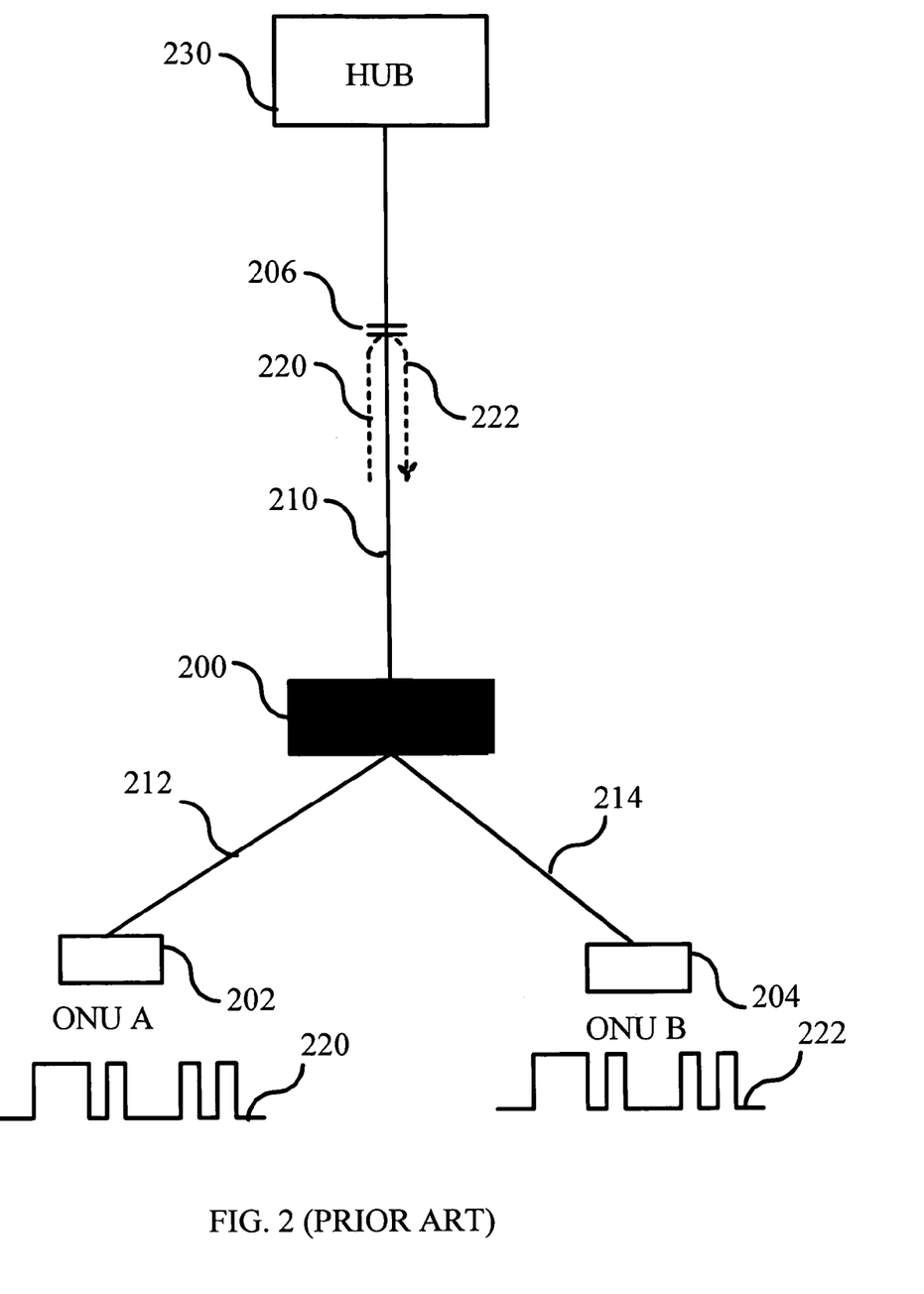
FIG. 2 is a block diagram illustrating a prior art solution that shows a confidentiality and privacy problem associated with prior art EPONS.

In order to overcome these problems various solutions have been proposed in prior art. One such solution is to use encryption for the upstream data traffic, for instance, so that an encrypted point-to-point data link layer connection is formed between HUB 230 and transmitting ONU 202. The encryption may be based on a symmetric encryption method or an asymmetric encryption method. However, due to the point-to-multi point nature of EPONs, the downstream traffic from HUB 230 to a given ONU may be encrypted in order to prevent eavesdropping by other ONUs connected to the same EPON. The key exchange mechanisms to be used in the case where the upstream connection cannot be regarded as secure, are vastly more complicated compared to the case where the upstream connection can be regarded as reliable. By a secure connection in this case is meant a connection supporting privacy and confidentiality. More complicated mechanisms always leads to the consumption of processing capacity, for example, in ONUs 202, 204, and delays in transmission. Encryption is not a mandatory feature as such in EPON. In some implementations the system could be used without encryption.

An example of a key exchange mechanism to be used when the upstream connection is not reliable is the Diffie-Hellman protocol, which is disclosed, for example, in IETF RFC 2631. If the upstream connection is secure, the establishing of a secure downstream connection from, for example, HUB 230 to ONU 202, is rather easy. For example, it is sufficient to transmit a shared secret or encryption key from ONU 202 to HUB 230 prior to downstream signal transmission.

If separate fiber is used for up and downstream optical isolators can be used to overcome the security problems. This is a rather expensive solution.

SUMMARY OF THE INVENTION

The purpose of certain embodiments of the invention is to solve the problems discussed before. Particularly, the purpose of certain embodiments of the invention is to ensure secure and confidential upstream data transmission in Ethernet passive optical networks.

One embodiment of the invention discloses a method for ensuring confidentiality of signal transmission in a point-to-multi point data transmission network that includes at least one hub, at least one transmission medium and at least one station connected to the hub via the at least one transmission medium. In the method an upstream signal is transmitted from a first station. The upstream signal is reflected by at least one disturbing reflector for producing a disturbing reflection and the disturbing reflection is combined with a second reflection of the upstream signal to render the second reflection undependable by a second station.

Another embodiment of the invention discloses also a system for ensuring confidentiality of signal transmission in a point-to-multi point data transmission network including at least one hub, at least one transmission medium and at least one station connected to the hub via the at least one transmission medium. The disclosed system further includes at least one disturbing reflector placed upstream of a station and a possible point of eavesdropping, for producing a disturbing reflection of a signal transmitted by the station. The disturbing reflection combines with a second reflection of the signal.

Yet another embodiments of the invention also discloses a network, including at least one hub, transmission medium and at least one station connected to the hub via the transmission medium. The data transmission network further includes at least one disturbing reflector placed upstream of a station and a possible point of eavesdropping in the transmission network for producing a disturbing reflection of a signal transmitted by the station. The disturbing reflection combines with a second reflection of the signal.

Still another embodiment of the invention also discloses a transmission apparatus including at least one optical splitter and at least one connector for an optical network unit. The transmission apparatus further includes at least one disturbing reflector placed upstream of a station and a possible point of eavesdropping in the transmission network for producing a disturbing reflection of a signal transmitted by the station. The disturbing reflection combines with a second reflection of the signal.

According to certain embodiments, the disturbing reflector is beneficially located on the upstream side of a splitter, which connects the transmitting station and the station that is eavesdropping. The disturbing reflector can be also on the upstream side of the unwanted reflection. The disturbing reflector produces a disturbing signal, which makes the detection of the unwanted reflection impossible.

In one embodiment of the invention the second reflection is an unwanted reflection. In one embodiment of the invention the reflection and combining means include a disturbing reflector, which produces a reflection of a signal transmitted via one of the connectors, and a splitter, which combines the signal transmitted and the reflection produced. In one embodiment of the invention the transmission medium is an optical fiber. It should be noted that by an optical fiber in this case is meant either a single physical fiber or several interconnected fibers that are connected using splitters. The transmission medium may also be any other medium, for example a coaxial cable. The transmission medium may also include two separate physical circuits or channels, one for upstream traffic and the other for downstream traffic. In the case where the transmission medium is an optical fiber, the data transmission network may be an Ethernet passive optical network and the stations may be optical network units. A disturbing reflector can be a long continuous reflector or combined from a number of discrete reflectors. Examples of reflectors are the Bragg reflectors. The disturbing reflectors may be located in a redundant branch of an optical splitter.

The benefits of certain embodiments of the invention are related to the confidentiality and security of signal transmission in EPONS. The method and system according to some of these embodiments is simplified since there is no need for expensive mutual key exchange algorithms. It is sufficient to provide confidentiality in the downstream transmission. Processing performance in the ONUs is saved. Similarly, the delay in the transmission of data is avoided, because the key exchange before data transmission can be simplified or omitted.

BRIEF DESCRIPTION OF THE DRAWINGS

The accompanying drawings, which are included to provide a further understanding of the invention and constitute a part of this specification, illustrate embodiments of the invention and together with the description help to explain the principles of certain embodiments of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 3:
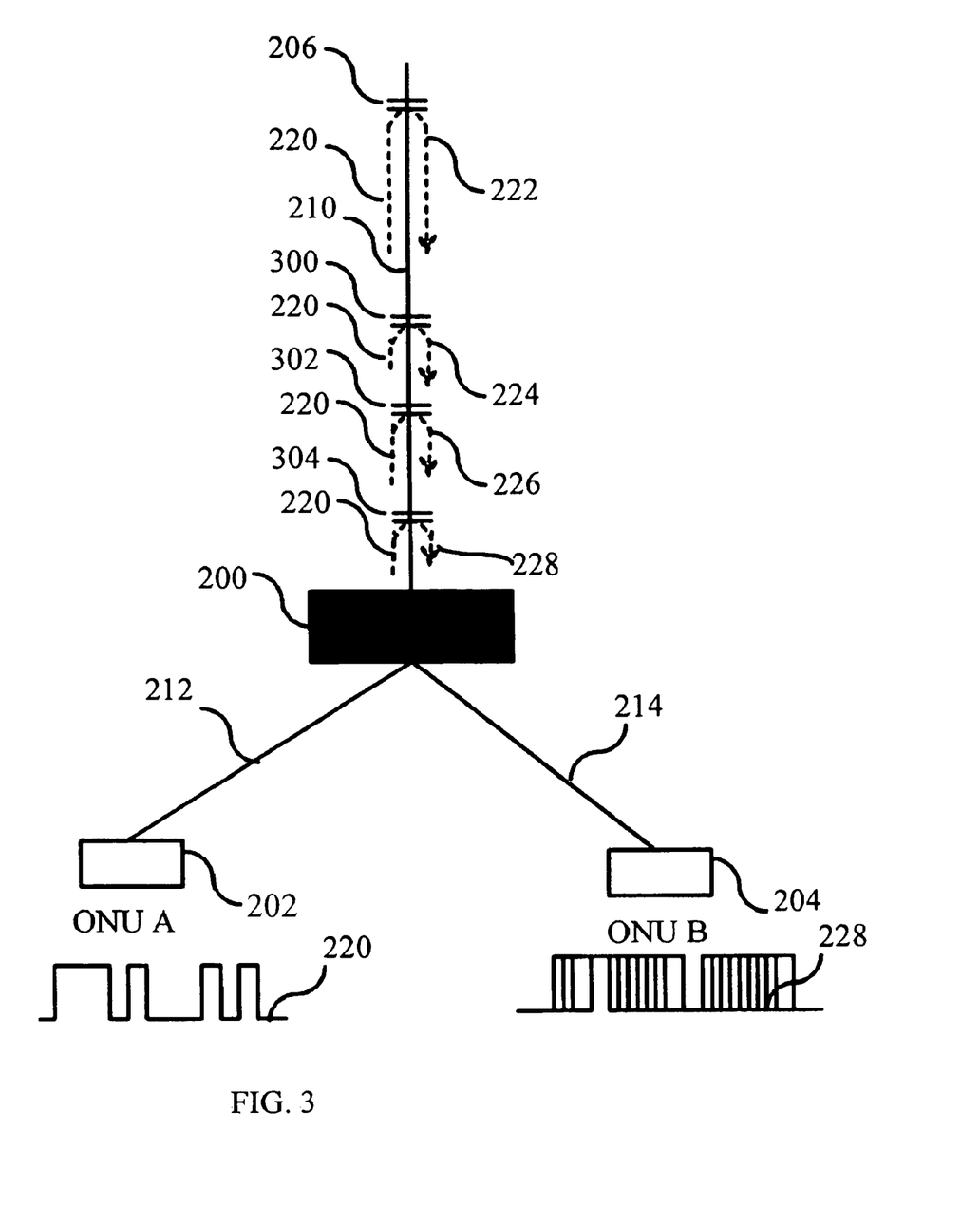
FIG. 3 is a block diagram depicting a system, a network and a transmission apparatus utilizing the use of optical disturbing reflectors, in accordance with certain embodiments of the invention.

FIG. 3 illustrates a block diagram depicting an EPON that utilizes one embodiment of the invention. The exemplary EPON includes two ONUs 202, 204. ONUs 202 and 204 are connected to an optical splitter 200 that connects fiber 210 to a fiber 212 and a fiber 214. ONUS 202 acts as the transmitting terminal that is transmitting a signal 220 to fiber 210. ONU 204 is causing a potential confidentiality problem for the transmission, since signal 220 is reflected back from a reflecting element 206 so that the intensity of the reflection permits reception at ONU 204 end of fiber 214. Reflecting element 206 is assumed to be a part of the EPON infrastructure, which cannot be eliminated or is too difficult and/or expensive to eliminate. Besides, its precise location or reflecting quality may be unknown. In accordance with certain embodiments of the invention, fiber 210 is equipped with three disturbing reflectors 300, 302 and 304. The numbers of disturbing reflectors, ONUs and HUBs mentioned herein should be seen just as examples for the purposes of the description of certain embodiments of the invention. The number of disturbing reflectors, ONUs and HUBs is thus not limited to their number in this example or any other example explained herein, but instead may vary in any embodiments or implementations of the invention. Particularly, the number of disturbing reflectors may be chosen by a network designer.

Signal 220 transmitted from ONU 202 is reflected at each of the disturbing reflectors 300, 302 and 304, thereby generating the disturbing reflections 224, 226 and 228 respectively. Transmitted signal 220 may be recoverable from a reflection 222 directly, since no other signals of sufficient intensity are combined with it. From the point of view of this embodiment, reflection 222 can be denoted as an unwanted reflection. However, at reflector 300, reflection 222 combines with a second reflection of the signal 220, which is caused by reflector 300. Due to propagation delay, the second reflection has a time displacement from the reflection 222. Due to the time displacement, reflection signal 224 that includes reflection 222 and the second reflection is scrambled. The bits of reflection 222 and the second reflection are not aligned in time. Reflection signal 224 is further combined with a reflection of transmitted signal 220 at disturbing reflector 302 thereby generating a reflection signal 226 where signal 224 is further scrambled. Finally, reflection signal 226 is further combined with a reflection of the transmitted signal 220 at the disturbing reflector 304 resulting in a reflection signal 228. When reflection signal 228 is received at ONU 204, original signal 220 is no longer recoverable since reflection signal 228 is a combination of several reflections of original signal 220, each reflection having a different time displacement from the start of signal 220.

Figure 4:
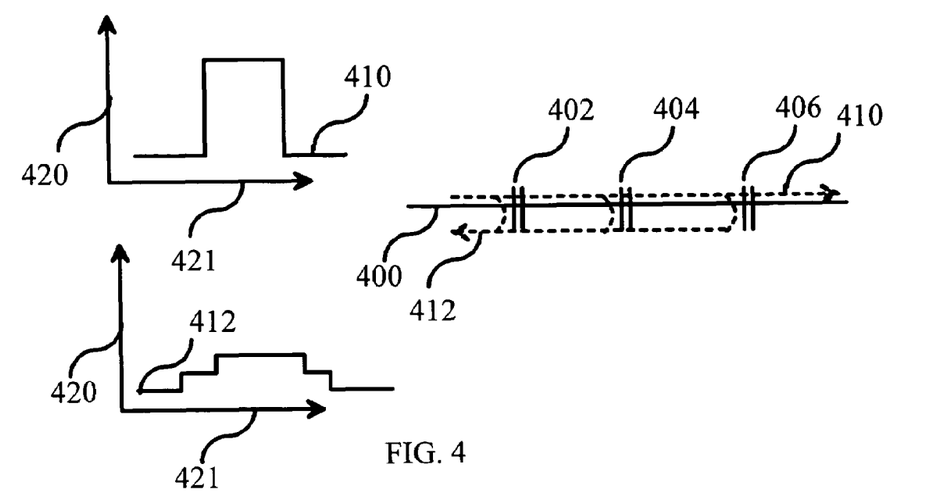
FIG. 4 is a block diagram illustrating the use of a disturbing reflector combined from discrete reflectors, in accordance with certain embodiments of the invention.

FIG. 4 illustrates a block diagram depicting one embodiment of the invention where disturbing reflectors are implemented as discrete reflectors, for example as Bragg reflectors. An original signal 410 sent on an optical fiber 400 is reflected at three different disturbing reflectors 402, 404 and 406 inserted to an optical fiber 400. A reflected signal 412 represents a combination of each of the reflections caused by reflectors 402, 404 and 406. A pulse of original signal 410 is depicted on X-axis 421 and Y-axis 420, where Y-axis 420 represents signal intensity and X-axis 421 time. A resulting signal pulse 412 is as well depicted on X-axis 421 and Y-axis 420. The reflected signal 412 represents a sum of lower intensity reflections of original signal pulse 410. Each reflection has different time displacement from the start of original signal 410 thereby producing reflected signal 412 in which signal pulse is scrambled.

Figure 5:
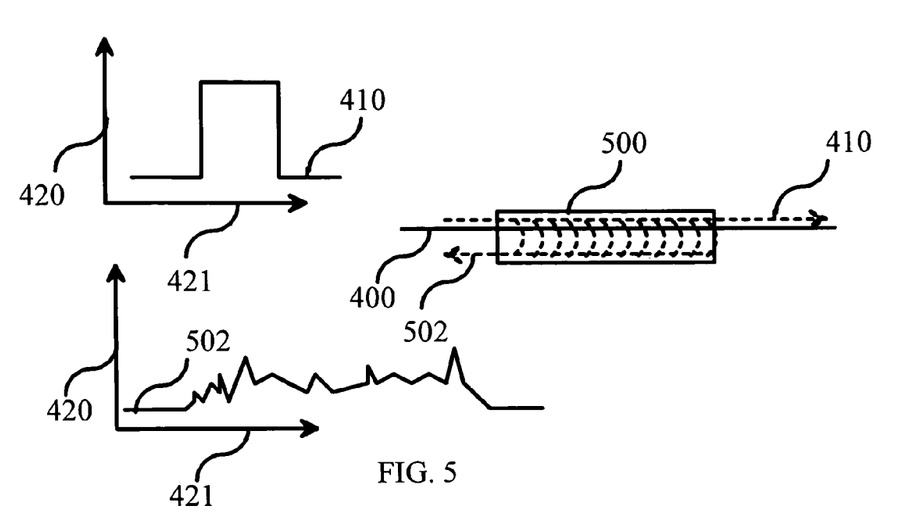
FIG. 5 is a block diagram illustrating the use of a single long continuous reflector, in accordance with certain embodiments of the invention.

FIG. 5 is illustrates a block diagram depicting one embodiment of the invention where disturbing reflectors are implemented as a single long continuous reflector. An optical fiber 400 along which a signal 410 is transmitted has a long continuous reflector 500. The long continuous reflector 500 reflects signal energy of signal 410 along the whole length of long continuous reflector 500. The reflection characteristics may vary along the length of the long continuous reflector 500, thereby producing a reflection 502 of uneven intensity. When combined with an unwanted reflection of transmitted signal 410, reflection 502 will scramble the unwanted reflection thereby rendering it unrecognizable. The long continuous reflector must produce a reflection of sufficient intensity taking into consideration the intensity of the reflection to be scrambled. The intensity of reflection 502 must be sufficient at all its duration in order to prevent detection of pulses from the unwanted reflection.

Figure 6:
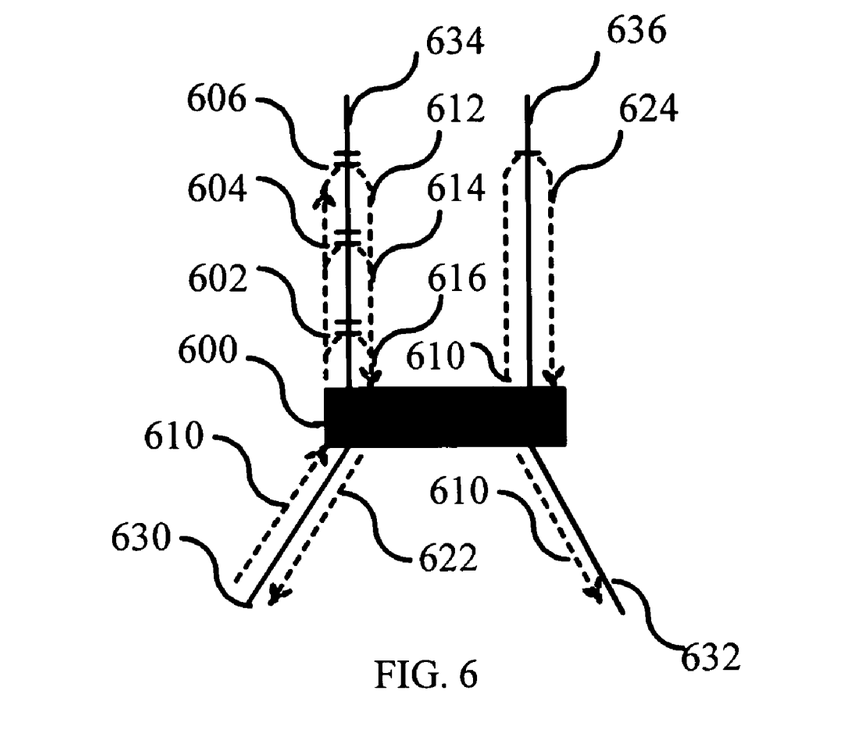
FIG. 6 is a block diagram depicting one embodiment of the invention utilizing a 2*N or N*N optical splitter.

FIG. 6 is illustrates a block diagram depicting one embodiment of the invention where disturbing reflectors are used in the context of a 2*N or N*N optical splitter. A splitter 600 has two optical fibers 630 and 632 that lead towards two or more ONUs either directly or via one of several other splitters. Splitter 600 has an optical fiber 636 that is used for conveying upstream signals towards an eventual recipient. Optical fiber 636 is connected to some equipment or element that generates an unwanted reflection 624 of an upstream signal 610. In order to provide confidentiality in accordance with the invention, an extra optical fiber 634 from splitter 600 is equipped with three discrete disturbing reflectors 602, 604 and 606. The numbers of disturbing reflectors, ONUs, splitters and optical fibers mentioned herein should be seen just as examples for the purposes of the description of certain embodiments of the invention. The number of disturbing reflectors, ONUs and optical fibers is thus not limited to their number in this example, but instead may vary in any embodiments or implementations of the invention. Disturbing reflector 606 generates reflection 612. Disturbing reflector 604 generates a reflection, which combines with the reflection 612 thereby producing a reflection 614. Disturbing reflector 606 generates a reflection, which combines with reflection 614 thereby producing a reflection 616. When reflection 616 combines with an unwanted reflection 624 at the splitter 600, a reflection 622 is thus generated in which transmitted signal 610 has been rendered indistinguishable and undependable. An ONU or an eavesdropper will not be able to decode transmitted signal 610 from reflection 622. In addition to additive combination of reflected signals, there will also be interference of optical carriers, causing beat noise due to the optical phase differences.

It is obvious to a person skilled in the art that with the advancement of technology, the basic idea of the invention may be implemented in various ways. The invention and its embodiments are thus not limited to the examples described above; instead they may vary within the scope of the claims.

We claim:

1. A method for ensuring confidentiality of signal transmission in a point to multipoint data transmission network, wherein the data transmission network comprises at least one hub, at least one transmission medium and at least one station connected to said hub via said at least one transmission medium, the method comprising:
   receiving an upstream signal from a first station;
   reflecting said upstream signal by at least two disturbing reflectors to produce at least two disturbing reflection signals; and
   combining said at least two disturbing reflection signals with an unwanted reflection signal of said upstream signal produced by a reflecting element such that said unwanted reflection signal is rendered undecodable by a second station;
   wherein said at least two disturbing reflectors are located in a single branch of the data transmission network.

2. The method according to claim 1, wherein the upstream signal is received through an optical fiber.

3. The method according to claim 1, wherein said data transmission network comprises an Ethernet passive optical network and said first station comprises an optical network unit.

4. The method according to claim 1, wherein said at least two disturbing reflectors comprise at least two discrete reflectors.

5. The method according to claim 1, wherein said at least two disturbing reflectors comprise a single long continuous reflector.

6. A system for ensuring confidentiality of signal transmission in a point to multipoint data transmission network, wherein data transmission said network comprises at least one hub, at least one transmission medium and at least one station connected to said hub via said at least one transmission medium, the system comprising:
   at least two disturbing reflectors positioned upstream of a first station and a possible point of eavesdropping in the point-to-multi point data transmission network, wherein said at least two disturbing reflectors are configured to produce at least two disturbing reflection signals of an upstream signal received from said first station, and further wherein said at least two disturbing reflection signals are combined with an unwanted reflection signal of said upstream signal, wherein the unwanted reflection signal is produced by a reflecting element;
   wherein said at least two disturbing reflectors are located in a single branch of the data transmission network.

7. The system according to claim 6, wherein said transmission medium comprises an optical fiber.

8. The system according to claim 7, wherein said data transmission network comprises an Ethernet passive optical network and said first station comprises an optical network unit.

9. The system according to claim 7, wherein said at least two disturbing reflectors comprise at least two discrete reflectors.

10. The system according to claim 7, wherein said at least two disturbing reflectors comprise a single long continuous reflector.

11. A transmission apparatus, comprising:
 at least one optical splitter;
 at least one connector for an optical network unit; and
 at least two disturbing reflectors configured to produce at least two disturbing reflection signals of an upstream signal received from the optical network unit;
  wherein said at least two disturbing reflection signals are combined with an unwanted reflection signal of said upstream signal produced by a reflecting element;
  wherein said at least two disturbing reflectors are located in a single branch of a data transmission network.

12. The transmission apparatus according to claim 11, wherein said at least two disturbing reflectors comprise at least two discrete reflectors.

13. The transmission apparatus according to claim 11, wherein said at least two disturbing reflectors comprise a single long continuous reflector.

14. A point-to-multi point data transmission network, comprising:
 at least one hub;
 at least one transmission medium;
 at least one station connected to said hub via said at least one transmission medium;
 receiving means for receiving an upstream signal from a first station;
 reflection means for producing at least two disturbing reflection signals; and
 combination means for combining said at least two disturbing reflection signals with an unwanted reflection signal of said upstream signal such that said unwanted reflection signal is rendered undecodable by a second station;
  wherein said reflection means are located in a single branch of the data transmission network.

15. A system for ensuring confidentiality of signal transmission in a network, wherein the network comprises at least one hub, at least one transmission medium and at least one station connected to said hub via said at least one transmission medium, the system comprising:
 at least two disturbing reflection means positioned upstream of a first station and a possible point of eavesdropping in the network for producing at least two disturbing reflection signals of an upstream signal transmitted from said first station, wherein said at least two disturbing reflection signals are combined with an unwanted reflection signal of said upstream signal, wherein the unwanted reflection signal is produced by a second a second reflection means;
 wherein said at least two disturbing reflection means are located in a single branch of the network.

16. A transmission network comprising:
 at least one hub;
 at least one transmission medium;
 at least one station connected to said hub via said at least one transmission medium; and
 at least two disturbing reflection means positioned upstream of a first station and a possible point of eavesdropping in said transmission network, for producing at least two disturbing reflection signals of an upstream signal received from said first station, wherein said at least two disturbing reflection signals are combined with an unwanted reflection signal of said upstream signal, wherein the unwanted reflection signal is produced by a second reflecting means;
 wherein said at least two disturbing reflection means are located in a single branch of the transmission network.

17. A transmission apparatus, comprising:
 at least one optical splitters;
 at least one connector for an optical network unit; and
 at least two disturbing reflection means positioned upstream of a first station and a possible point of eavesdropping in a transmission network for producing at least two disturbing reflection signals of an upstream signal received from said first station, wherein said at least two disturbing reflection signals are combined with an unwanted reflection signal of said upstream signal, wherein the unwanted reflection signal is produced by a second reflecting means;
 wherein said at least two disturbing reflection means are located in a single branch of the transmission network.

* * * * *

UNITED STATES PATENT AND TRADEMARK OFFICE
CERTIFICATE OF CORRECTION

PATENT NO. : 7,593,638 B2  
APPLICATION NO. : 10/717601  
DATED : September 22, 2009  
INVENTOR(S) : Olli Pekka Pohjola and Ari Tervonen It is certified that error appears in the above-identified patent and that said Letters Patent is hereby corrected as shown below:

TITLE PAGE, ITEM (57)

Abstract, Line 2:

Replace "point-to-multi point" with "point-to-multipoint"

Abstract, Line 3:

Replace "Ether net" with "Ethernet"

Abstract, Line 10:

Replace "undependable" with "undecodable"

Claim 6, Column 6, Line 56:

Replace "point-to-multi point" with "point-to-multipoint"

Claim 14, Column 7, Line 28:

Replace "point-to-multi point" with "point-to-multipoint"

Claim 15, Column 8, Line 11:

Delete "a second" before the word "reflection"

Signed and Sealed this

Eighth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,593,638 B2  Page 1 of 1
APPLICATION NO. : 10/717601
DATED : September 22, 2009
INVENTOR(S) : Pohjola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Second Day of November, 2010

David J. Kappos
*Director of the United States Patent and Trademark Office*